No. 742,202. PATENTED OCT. 27, 1903.
L. J. LINDSAY.
MARKER FOR CORN PLANTERS.
APPLICATION FILED JULY 26, 1902. RENEWED SEPT. 5, 1903.
NO MODEL. 2 SHEETS—SHEET 2.
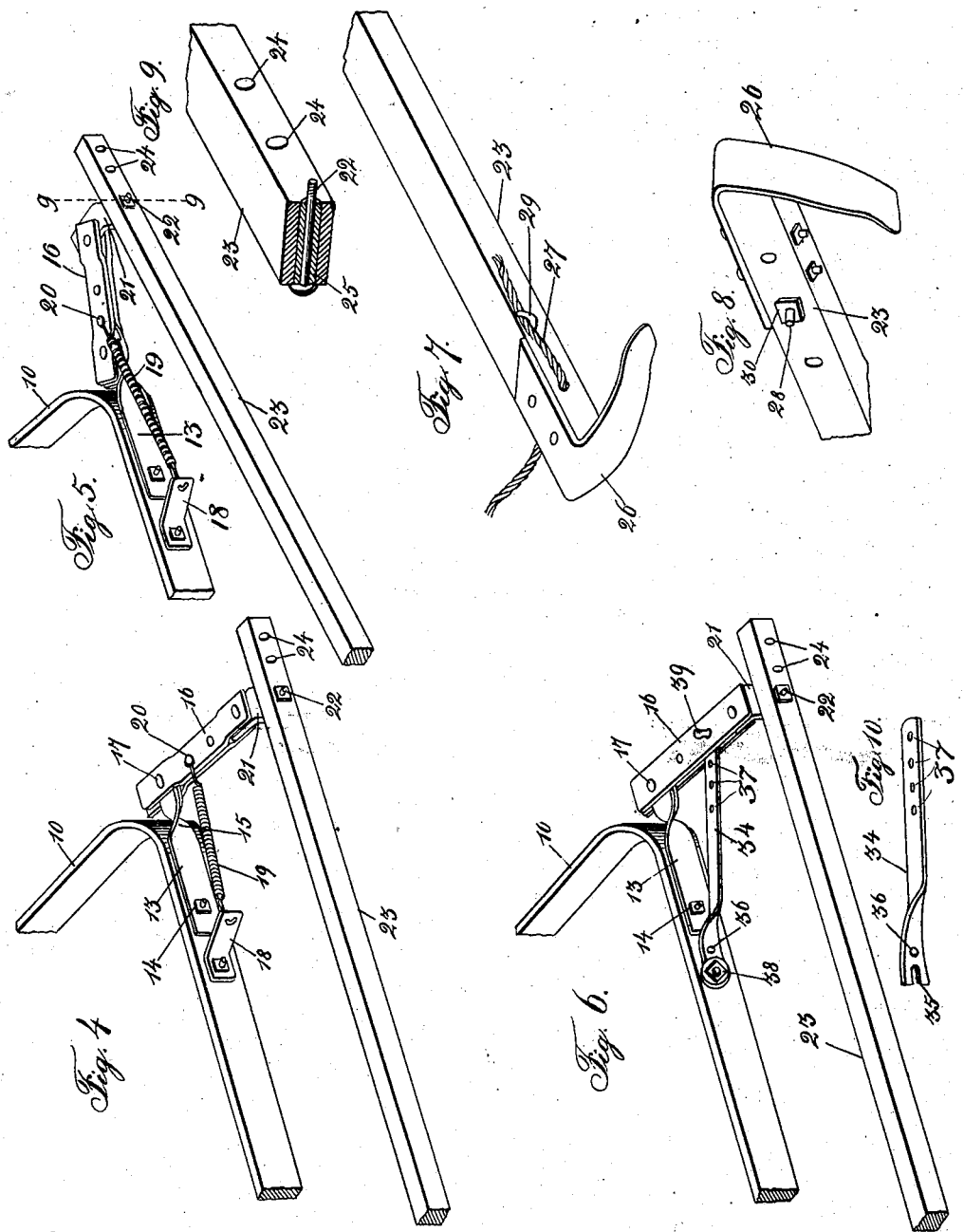

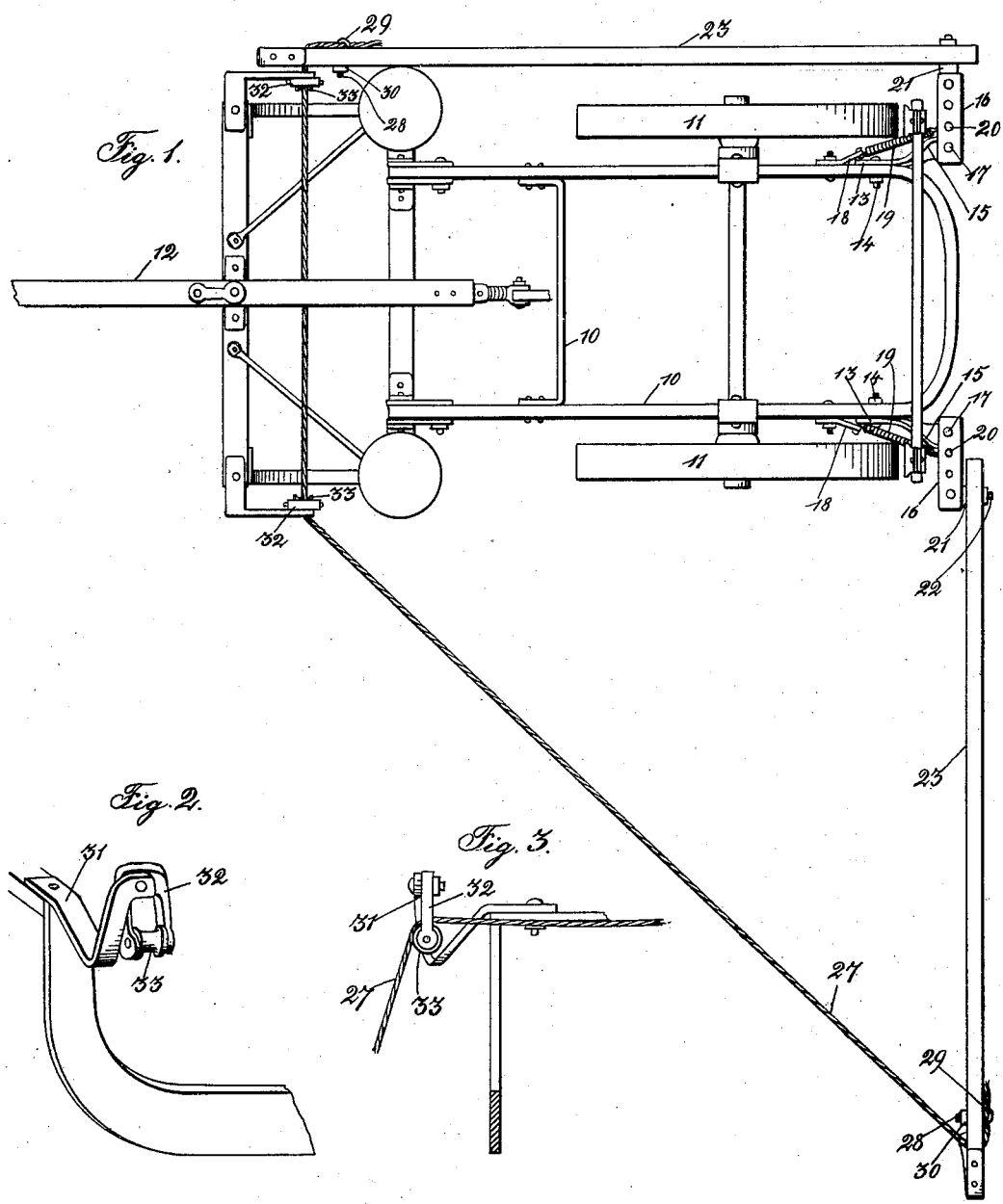

No. 742,202. Patented October 27, 1903.

UNITED STATES PATENT OFFICE.

LEROY J. LINDSAY, OF SEYMOUR, IOWA.

MARKER FOR CORN-PLANTERS.

SPECIFICATION forming part of Letters Patent No. 742,202, dated October 27, 1903.

Application filed July 26, 1902. Renewed September 5, 1903. Serial No. 172,178. (No model.)

*To all whom it may concern:*

Be it known that I, LEROY J. LINDSAY, a citizen of the United States, residing at Seymour, in the county of Wayne, State of Iowa, have invented a new and useful Marker for Corn-Planters, of which the following is a specification.

This invention relates to that class of markers in which two marker-arms are pivotally attached to the opposite sides of the rear end portion of the corn-planter frame, their free ends being connected by means of a rope, the parts being so arranged that when the machine is advanced in one direction across the field one of the marker-arms projects substantially at right-angles to the machine-frame and marks the ground for the next row, the other arm being carried along the side of the machine-frame and above the ground, and then when the machine-frame is turned at the end of the field the marker-arm resting upon the ground remains stationary until the other arm drops by gravity and engages the ground-surface. Then as the planter is further turned the other arm automatically moves to a position at right angles to the machine-frame, with its end resting on the ground, while the first-mentioned arm is automatically drawn by a rope to a position parallel with the machine-frame.

The objects of my invention are to provide a device of this class of simple, durable, and inexpensive construction, in which the marker-blade is so shaped that when being drawn across a field it cannot enter the ground to such an extent as to stick in the ground, and is also so shaped that when it strikes a furrow turned at right angles to the line of advance of the planter the said marker-blade will rise out of the furrow and not enter the ground on the opposite side of said furrow.

A further object is to provide a device of this class in which the marker-arm may be readily and quickly adjusted as to length, so that the indicating-furrow may be made at any desirable distance from the furrow previously planted, and to provide means whereby in the event that the marker-arm should strike a fixed obstruction on the ground-surface it will yield sufficiently to permit the machine to be stopped or to permit the marker-blade to ride over or around the obstruction, and as soon as the obstruction is passed the marker-arm will automatically return to its former position.

A further object is to provide means for supporting the rope that connects the marker-arms in such manner as to minimize the friction on the rope to the end that the rope will not become quickly worn out.

A further object is to provide means for connecting the marking device to the frame of the planter, so that the device may be attached to planters of any ordinary size or shape.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a top or plan view of a planter-machine frame having my improved marker connected therewith. Fig. 2 shows in perspective a part of the planter-runner or furrow-opener and one of the roller-supporting brackets to serve as a rope-guide. Fig. 3 shows a rear elevation of the same parts with the rope in position thereon. Fig. 4 shows in perspective one of the rear corners of the planter-machine frame with my improvement applied thereto, showing the marker-arm-supporting lever in position at right angles to the longitudinal center of the machine-frame. Fig. 5 shows a like view with the marker-arm-supporting lever extending rearwardly. Fig. 6 shows a similar view illustrating a modified frame in which the spring is dispensed with and a rigid strap substituted therefor. Fig. 7 shows an enlarged perspective view showing one end portion of one of the marker-arms with a marker-blade attached and also illustrating the means for adjustably securing the rope thereto. Fig. 8 shows a perspective view of the same parts, taken from the opposite side. Fig. 9 shows a detailed sectional perspective view of the opposite end of one of the marker-arms, illustrating the means for attaching the marker-arm to its supporting-lever; and Fig. 10 shows a perspective view of the metal strap used in the modified frame shown in Fig. 6.

Referring to the accompanying drawings, I have used the reference-numeral 10 to indicate the frame of the planter, 11 the supporting-wheels therefor, and 12 the tongue. These parts are all of the ordinary construction, and my attachment applies equally well to machines of different structures. One marker-arm is connected with each of the rear corners of the machine-frame, and the marker-arms and their connecting means are identical, so that one only will be particularly described.

The reference-numeral 13 indicates a bracket secured to the frame 10 by means of the bolt 14 and twisted at 15, so that its rear end is at right angles to its front end. Pivoted to the rear end of the bracket 13 is a lever 16, composed of two parts riveted together, the said parts being separated slightly at each end. At one end the rear end of the bracket 13 is introduced between the upper and lower parts of the lever, and a bolt 17 is passed through the lever and bracket to form a pivot on which the lever may move. Said lever is capable of movement on the bracket only as far forwardly as shown in Fig. 4, because at that point the outer edge of the rear end of the bracket 13 engages the shoulder at the point where the parts of the lever are separated, as clearly shown in Fig. 4, and the rearward movement of this lever is limited to the point shown in Fig. 5, because when in this position the upper part of the inner end of the lever strikes against the twisted portion of the bracket 13, as clearly shown in Fig. 5. In this connection I have provided means whereby the lever 16 is normally held to the forward limit of movement, as follows: The numeral 18 indicates a strap secured to the frame 10 in front of the bracket 13, and a contractile coil-spring 19 is attached to the outer end of the strap 18 and also to a pin 20, attached to the lever 16, and when said lever is forced rearwardly against the pressure of the spring 19 the said spring will return it as soon as the pressure is removed. Pivoted to the outer end of the lever 16 is a hanger 21, having a bolt 22 passed through its lower end.

The numeral 23 indicates the marker-arm, having at one end a series of openings 24 to receive the bolt 22. As clearly shown in Fig. 9, I have provided a sleeve 25 to be passed through one of the openings 24 and to receive the bolt 22, so that the marker-arm may be firmly connected with the hanger, and yet may freely swing upon the sleeve, and I have provided a number of the openings 24, so that the marker-arm may be connected with the hanger at different points.

Fixed to the outer end of the marker-arm is the marker-blade 26, which blade is shaped as follows: Assuming the marker-arm to be in position at right angles to the longitudinal center of the machine, the blade inclines downwardly and toward the center portion of the arm, and its lower edge, which rests upon the ground-surface, inclines toward the longitudinal center of the machine-frame at a point in the rear of the machine, so that as the marker-blade is being advanced over the ground-surface in said position it will readily ride over the ground-surface, no matter how rough or uneven the ground-surface may be, and will ride out of furrows extending at right angles to the line of advance. Furthermore, the incline of the lower edge of the blade will tend to hold the marker-arm at its rearward limit of movement.

The reference-numeral 27 indicates a rope having its end portions passed through the outer ends of the marker-arms and adjustably held to the marker-arms by means of the bolts 28, passed through the marker-arms, and having the hooks 29 on one end to receive and secure the end portion of the rope against the marker-arm. Obviously by tightening the nut 30 to the bolt the rope may be firmly clamped to the marker-arm. This rope is of such length that when one arm is at right angles to the machine-frame the other arm will be substantially parallel therewith, as clearly illustrated in Fig. 1, and the rope is supported on the machine-frame as follows: Secured to the front end of the machine-frame are the brackets 31 and projecting downwardly and then rearwardly therefrom. Pivoted to the ends of the brackets 31 are the roller-supports 32, capable of swinging freely in a vertical plane, and mounted in each of these roller-supports is a grooved roller 33, over which the rope 27 passes. These roller-supports 32 are preferably placed in such a position that when the marker-arms are being carried substantially parallel with the machine-frame the rope will pass straight from the marker-arm over the adjacent roller 33. However, the said roller-holder is made capable of swinging in a vertical plane, so that if the marker-arm should be moved forwardly or rearwardly relative to the roller the roller-support will move forwardly or rearwardly to correspond therewith, so that the rope may always pass in a straight line from the marker over the roller 33. This obviously prevents wear upon the rope, such as would be occasioned if the marker-arm should be moved forwardly and rearwardly relative to the roller and the roller could not adjust itself to the position of the rope.

In the modified form shown in Figs. 6 and 10 I dispense with the spring 19 and substitute therefor a rigid strap 34, having in one end a slot 35 and a round opening 36 and having in its other end a series of openings 37. The front end of the strap 34 is secured to the machine-frame by means of a bolt 38, which may be passed through either the slot 35 or the opening 36, and the lower end of the strap 34 passes between the parts of the lever 16, and a wooden pin 39 is passed through the lever and through one of the openings 37. When this form of the device is used and assuming that the marker-arm strikes an unyielding obstruction, the pin 39 may break, and thus permit the marker-arm to move rearwardly without breaking the other parts of the device, or if the bolt 38 has been passed through the slot 35 the strap 34 may become disengaged from the bolt 35, so that in either case the other parts of the device will not become bent or broken, and if the pin 39 is broken or the strap is detached from the bolt 38 this may be easily repaired or adjusted, so that the operator may proceed with his work.

In practical use and assuming the device to be attached to a machine-frame and assuming, further, that the machine is advancing over the ground-surface one of the arms will be held in position at right angles to the machine-frame and the other arm will be held parallel with the machine-frame, on account of the pull of the dragging-arm upon the rope 27. When the machine reaches the end of the field, the machine is turned around in a direction toward the arm that stands at right angles thereto, the pivotal point of the machine being at about the center between its two wheels 11. As the machine thus turns the front of the machine will move toward the arm that is at right angles to the machine-frame, and as this arm is held stationary on account of its blade resting on the ground-surface the rope 27 will be slackened and the forward end of the other arm will drop to the ground, and as the machine further turns its front end will move away from the marker-arm that was previously parallel therewith toward the other marker-arm until the position of the marker-arms relative to the machine-frame has been reversed. It is customary in planting corn to dig a furrow at the end of the field at right angles to the rows being planted, and when turning in this manner one of the marker-arms is advanced over this furrow, and by having the blade of the marker-arm inclined under the marker-arm it obviously rides readily over this furrow. In the event that the marker-arm should strike any fixed obstruction the spring 19 will yield, so that the marker-arm may either clear the obstruction or the machine may be stopped before any of the attachment is broken, and as soon as the marker-arm passes the obstruction the spring will return it to its normal position. The hanger 21 at the end of the arm-supporting levers is necessarily pivoted to the lever, so that the said levers may always maintain their normal position relative to the machine-frame, and yet the marker-arms may swing from a position parallel with the frame to a position at right angles thereto. Obviously the marker-arms will automatically reverse their position as the machine is turned at each end of the row, the one moving from a position at right angles to the machine-frame to a position above the ground and parallel with the machine-frame and the other moving from a position parallel with the machine-frame to a position at right angles thereto.

Having thus described my invention, what I claim, and desire to secure by Letters Patent of the United States therefor, is—

1. The combination with a planting-machine, of two marker-arms pivotally connected with the machine-frame, brackets secured to the front portions of the machine-frame, roller-supports pivoted to said brackets and capable of swinging in a vertical plane, a roller carried by said supports, and a flexible connecting device attached at its ends to the marker-arms and passed through said rollers.

2. The combination with a corn-planter of two brackets attached to the machine-frame, two levers pivoted to the brackets to swing in a horizontal plane, two hangers pivoted to the outer ends of said levers to swing in a horizontal plane relative to the levers, means for yieldingly holding said levers to position substantially at right angles to the machine-frame, marker-arms pivoted to said hangers to swing in a vertical plane, markers on the ends of said arms, a flexible connecting device attached to said marker-arms and means for supporting the flexible connecting device on the forward end of the machine-frame.

3. The combination with a corn-planter of two brackets secured to the rear end portion of the machine-frame, two levers pivoted to said brackets to swing in a horizontal plane, means for limiting the movement of said levers, two contractile coil-springs connected with said levers and with the machine-frame in front of the levers to normally hold them at their forward limit of movement, hangers pivoted at the outer ends of said levers to swing in a horizontal plane, marker-arms pivoted to said hangers to swing in a vertical plane, markers on the end of the marker-arms, a flexible connecting device attached to said marker-arms, grooved rollers for supporting said flexible connecting device.

4. In a machine of the class described the combination of a marker-arm, a flat marker-blade attached to the marker-arm inclined downwardly and toward the center of the marker-arm and having its lower edge inclined from front to rear, so that its rear edge is farthest from the end of the marker-arm to which the blade is attached, for the purposes stated.

5. The combination with a corn-planter of two marker-arms pivotally connected with the machine-frame, grooved rollers connected with the machine-frame and a flexible connecting device passed over said grooved rollers and having its ends extended through the marker-arms and bolts, 28, passed through the marker-arms, each bolt having a hook, 29, on its end to receive the end portion of the flexible connecting device to clamp the flexible connecting device to the side of the marker-arm.

LEROY J. LINDSAY.

Witnesses:
J. W. ARMSTRONG,
J. H. HOUK.